May 23, 1967 R. D. KIRK 3,320,732
CUTTING BLADE ASSEMBLY FOR ROTARY LAWN MOWERS AND THE LIKE
Filed Feb. 17, 1965
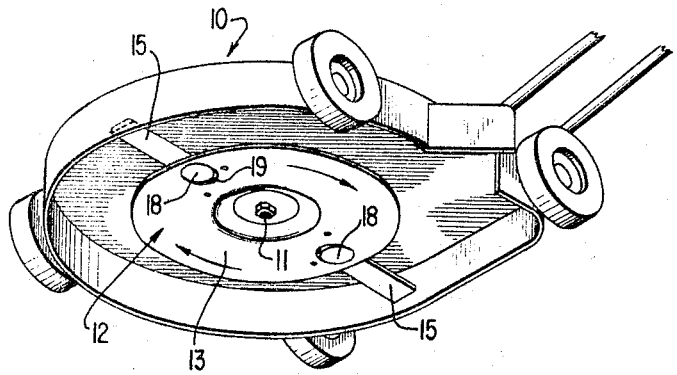
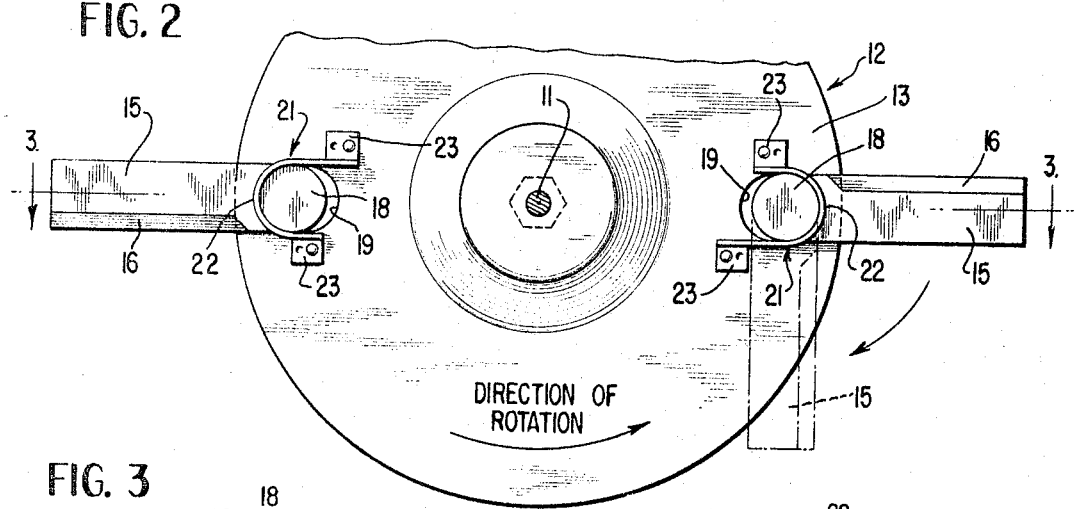
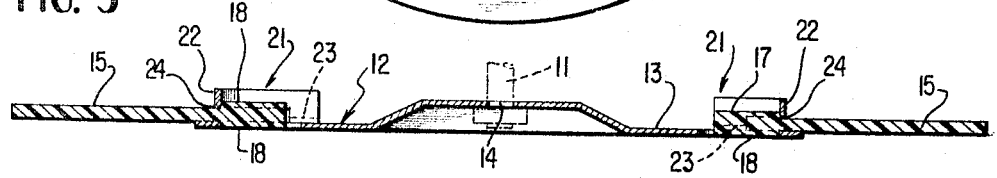
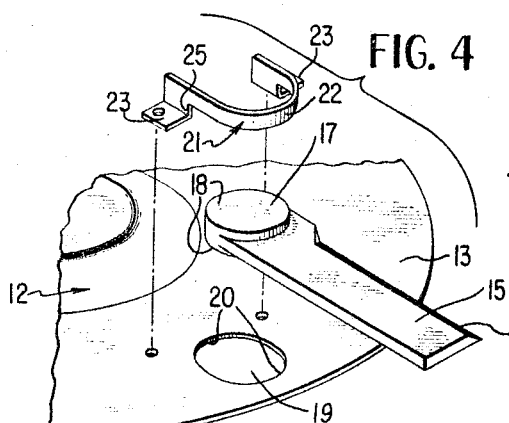
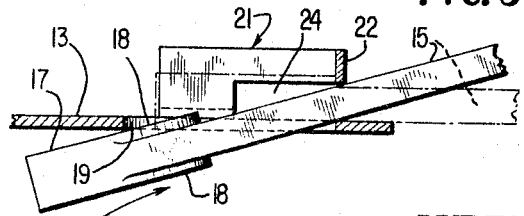
INVENTOR
RALPH D. KIRK
BY *B. P. Fisheleum, Jr.*
ATTORNEY United States Patent Office 3,320,732
Patented May 23, 1967

3,320,732
CUTTING BLADE ASSEMBLY FOR ROTARY
LAWN MOWERS AND THE LIKE
Ralph D. Kirk, Rte. 4, Easley, S.C. 29640
Filed Feb. 17, 1965, Ser. No. 433,405
8 Claims. (Cl. 56—295)

This invention relates to improvements in rotary mowers, and more particularly to an improved cutting blade and blade mounting for vertical axis type rotary mowers.

Conventional metal cutting blades for vertical axis type lawn mowers operate at high speeds and the blades are acted upon by very heavy centrifugal forces. When one of these blades or a portion thereof become detached from its carrier during high speed operation, serious injury and damage may result. The hazard is increased when the conventional steel blade strikes a fixed object while operating. Efforts have been made to alleviate this problem by mounting end portions of metal blades on pivot pins, usually carried by a rotating crossbar or blade body portion, the idea being that when the blade tip strikes a fixed object, it can pivot back or yield and thereby clear the object without damage. Such proposals have been only partly successful and in some cases have only increased the likelihood of injury or damage caused by separation of the pivoted blade tip, as where the pivot element fails under centrifugal force or impact.

It is the main object of this invention to overcome the above difficulties by the provision of a rotary mower blade and blade mounting which is safe, extremely rugged and durable, efficient in operation and economical to manufacture and maintatin.

More specifically, the invention concerns a rotary blade assembly which includes a circular carrier disc and one or more non-metallic cutter blades pivoted thereto in a novel and simplified manner which allows the blades to yield or swing back upon contact with a fixed object and which also makes it virtually impossible for the blades to separate from the carrier disc while in operation.

Another important object of the invention is to provide a rotary mower blade assembly in which the blade elements are easily and quickly removable and replaceable by hand and without the use of tools.

Another object is to make use of a modern lightweight tough flexible material for making the blades, such as urethane plastic or the like.

A further object is to provide a novel and extremely strong mounting bracket for attaching each blade removably to the circular carrier disc. Each blade is trapped between one of these brackets and the carrier disc in a novel manner, and the arrangement is such that the blades are held automatically in an extended cutting position by centrifugal force.

Other objects and advantages of the invention will be apparent during the course of the following detailed description.

In the accompanying drawings forming a part of this application and in which like numerals are employed to designate like parts throughout the same, FIGURE 1 is a bottom perspective view, partly diagrammatic, of a rotary type lawn mower equipped with a cutting blade assembly according to the present invention;

FIGURE 2 is an enlarged fragmentary plan view, partly in section, of the cutting blade assembly shown in FIGURE 1;

FIGURE 3 is a central vertical section taken on line 3—3 of FIGURE 2;

FIGURE 4 is a fragmentary exploded perspective view of the blade assembly; and

FIGURE 5 is an enlarged fragmentary view, partly in section and partly diagrammatic, showing the method of assembling each blade with the carrier disc and bracket by hand.

In the drawings, wherein for the purpose of illustration is shown a preferred embodiment of the invention, the numeral 10 designates any conventional vertical axis rotary type mower such as an electric motor powered or internal combustion engine powered mower having a depending vertical directly driven shaft 11.

The cutter blade assembly shown in its entirety at 12 is mounted bodily upon the depending shaft 11 and secured thereto in a conventional manner to turn therewith. The invention herein resides entirely in the blade assembly 12 and in the blade per se and its mounting, and the invention may be used on substantially any rotary mower of the vertical axis type or upon any cutting machine employing a high speed rotary shaft.

The cutting blade assembly 12 comprises a unitary circular carrier disc or plate 13 formed of steel or the like and provided in its center with an opening 14 to receive the shaft 11. The disc 13 is concentric with the shaft 11 and is therefore balanced centrifugally and forms the safest possible motion for high speed rotary operation. As shown in FIGURE 1, the disc 13 spans a considerable portion of the total area encompassed by the lawn mower so that the blade elements carried thereby may be relatively short elements.

The assembly 12 includes two diametrically opposed identical cutting blades 15 formed entirely of tough somewhat flexible rubber-like material, preferably urethane plastic or the like. The blades 15 may be considerably thicker than the steel carrier disc 13, FIGURE 3. The blades are relatively short, as shown, and while their width is not critical, they are formed wide enough so as to be quite rigid and able to perform the desired cutting operation. While the blades need not be sharp and do not require sharpening, their frontal edges 16 may be beveled during manufacturing, if desired.

Each blade 15 is provided at its inner end with an integral circular head or enlargement 17 whose diametrical width is equal to the width of the blade and whose axial thickness exceeds the thickness of the blade so that the head projects equidistantly from opposite faces of the blade to form disc-like retainer elements 18 on opposite sides of the blade, each having a circular configuration.

The carrier disc 13 is provided at diametrically opposite points near its periphery with somewhat radially elongated openings 19 having circularly curved ends 20, and these openings are adapted to receive the blades 15 removably in a manner to be further described. Adjacent each opening 19 of disc 13 is a blade retaining bracket or fastener 21 forming an important element of the invention. Each bracket 21 comprises a substantially U-shaped body portion or loop 22 whose sides are parallel and spaced apart a distance equal to the width of the adjacent opening 19 and the diameter of the blade retainer elements 18. The closed end of the loop 22 is circularly curved on a radius equal to the radius of the adjacent retainer element 18, as shown. Each body portion or loop 22 is held somewhat elevated from the disc 13 in assembly by a pair of depending L-shaped attaching feet 23 on the inner ends of the sides of the bracket 21. The feet 23 of each bracket 21 are fixedly anchored to the disc 13 by riveting or spot welding or a combination of both, as shown. The arrangement is such that the outer closed ends of the loops or body portions 22 are directly above and coincide with the outer circularly curved edges 20 of the openings 19. This arrangement of each bracket 21 on the disc 13 provides a horizontal passage 24 between the disc 13 and the elevated loop 22, within which the blade 15 proper is free to swing. Swinging movement of the blade, however, is limited or arrested by a stop shoulder 25 on each bracket 21 formed by the juncture of the foot 23 with the loop 22.

In operation, the head 17 of each blade 15 is adjacent one of the openings 19 and one of the brackets 21. The retainer or disc portions 18 of the head 17 engage within the adjacent opening 19 and within the confines of the loop 22 as clearly shown in FIGURE 3. The body portion of the blade 15 extends freely through the passage or slot 24 between the loop 22 and the underlying disc 13. Each blade is therefore held captive or trapped on the rotating disc 13 by the cooperating bracket 21. Under the influence of centrifugal force, each blade 15 will be automatically extended to the cutting position shown in FIGURE 2. However, when the blade encounters an obstruction during operation, it is free to pivot or swing back to the position shown in broken lines in FIGURE 2 until the rear edge of the blade engages the stop 25. It is to be noted that this free pivoting or swinging movement of the blades is obtained without the use of bolts, pins or other like elements more apt to fail under the pressure of centrifugal force. Furthermore, it is impossible for the blade 15 to become detached from the assembly during operation and due to the somewhat flexible material utilized for the blades, they would not be capable of causing severe injury or damage even if some abnormal failure did occur. Since the plastic material employed is lightweight in comparison to metal, the centrifugal effect even at high speeds is materially lessened. The extreme toughness and durability of urethane plastic enables the blades 15 to do an excellent job of cutting at high speed.

FIGURE 5 of the drawing shows somewhat diagrammatically the manner in which the blade can be removed or replaced without the use of any tools. The slight elongation of the opening 19 together with the flexibility of the blade 15 allows the blade to be slipped out rearwardly or inwardly with respect to the periphery of the disc 13, as illustrated. A replacement blade can likewise be slipped in forwardly to assume the broken line position shown in FIGURE 5. When assembled with the disc 13, the lower retaining portion 18 engages the outer curved edge 20 of the opening 19 while the top portion 18 of the blade engages the curved loop 22, as shown and described. It is thought that the advantages of the construction will be readily apparent to those skilled in the art without the necessity for any further description herein.

It is to be understood that the form of the invention herewith shown and described is to be taken as a preferred example of the same, and that various changes in the shape, size and arrangement of parts may be resorted to, without departing from the spirit of the invention or scope of the subjoined claims.

The invention having been described, what is claimed is:

1. A rotary mower cutter blade assembly comprising in combination a substantially circular disc adapted to turn with the driven shaft of said mower and having at least a pair of diametrically opposed openings, blade anchoring brackets secured to said disc adjacent said openings and including U-shaped portions elevated from one face of the disc and substantially aligned with outer curved edges of the openings, and blades having body portions extending between the disc and said elevated U-shaped portions and heads at the inner ends of the blades rotatably engaging the openings and the elevated U-shaped portions, whereby the blades are free to pivot upon the disc and are anchored firmly thereto for rotation therewith.

2. The invention as defined by claim 1, and wherein said blades are formed of tough rubber-like material.

3. The invention as defined by claim 2, and wherein said material is urethane plastic.

4. A mower blade assembly comprising a carrier disc adapted to revolve with the shaft of a mower and having a pair of diametrically spaced openings which are somewhat elongated radially and having outer circularly curved ends, substantially U-shaped brackets overlying said outer ends and substantially coinciding therewith and spaced from one face of said disc to thereby form a passage between the disc and said brackets, said brackets anchored to said disc on opposite sides of said openings, and cutter blades for said assembly adapted to project radially of the disc while cutting and swingable to retracted positions upon engagement of the blades with an obstruction, said blades provided at their inner ends and on opposite sides with circularly curved retaining head portions, one head portion rotatably engaging said circularly curved end of said disc opening and the other head portion rotatably engaging said U-shaped bracket, the body portion of each blade extending through the passage between the disc and bracket.

5. The invention as defined by claim 4, and feet on the sides of said brackets secured rigidly to the disc on opposite sides of said openings, corresponding feet on each bracket constituting positive stop elements to limit the swinging retraction of said blades when the latter encounter an obstruction.

6. The invention as defined by claim 4, and wherein said blades are somewhat flexible and may be detached bodily from the discs and brackets by flexing their rear ends downwardly through said openings while sliding the blades rearwardly through said passages.

7. A cutter blade assembly for lawn mowers and the like comprising a relatively large diameter generally flat sheet metal disc to rotate with the shaft of a lawn mower, substantially U-shaped blade retainer brackets on one face of said disc at opposite sides thereof, said brackets having closed curved sides facing outwardly and having their inner sides facing inwardly in opposed relation, said curved sides spaced above said disc to form passage between the brackets and disc, and blades formed of tough rubber-like material engaging through said passages and adapted to project radially beyond the disc when cutting and having heads on their inner ends slidably and rotatably engaging the closed curved sides of the brackets, whereby the brackets allow free pivoting of the blades upon the disc while positively restraining the blades from outward movement by centrifugal force.

8. The invention as defined by claim 7, and a stop element on each bracket formed by a part of the bracket and engaging each blade to limit pivoting thereof in one direction.

No references cited.

ANTONIO F. GUIDA, *Acting Primary Examiner.*

ABRAHAM G. STONE, *Examiner.*